United States Patent
Lemke

[15] 3,661,261
[45] May 9, 1972

[54] METHOD AND APPARATUS FOR FLUSHING SEWERS

[72] Inventor: Arthur A. Lemke, Evanston, Ill.
[73] Assignee: FMC Corporation
[22] Filed: Dec. 31, 1970
[21] Appl. No.: 103,075

[52] U.S. Cl.............................210/83, 137/215, 137/397, 210/120, 210/128
[51] Int. Cl......................................................B01d 21/00
[58] Field of Search....................210/83, 104, 108, 119, 128, 210/129, 170, 120; 137/215, 397

[56] References Cited

UNITED STATES PATENTS

| | | | |
|---|---|---|---|
| 646,832 | 4/1900 | Houghton | 137/397 |
| 970,411 | 8/1910 | Woodall | 137/397 X |
| 1,407,136 | 2/1922 | Ehrhart | 137/215 |
| 1,918,678 | 7/1933 | Wiaz, Jr. | 137/397 X |

Primary Examiner—John Adee
Attorney—Dressler, Goldsmith, Clement & Gordon

[57] ABSTRACT

This application describes method and apparatus for creating a flow of aqueous waste periodically which will eliminate from sewers and manholes any settled solids accumulated therein, which consists of a sewage accumulation tank positioned in a manhole and communicating with the liquid sump thereof at a level below that of the outlet sewer conduit. The tank is adapted with vacuum means to induce flow of sewage into the accumulation tank and means for introducing air into the tank to eliminate the vacuum and to release the accumulated sewage rapidly to join with the normal sewage flow to produce a flushing surge of liquid flowing in the sewer conduit.

8 Claims, 3 Drawing Figures

INVENTOR
Arthur A. Lemke
BY Dresser, Goldsmith, Clement & Gordon
ATTORNEYS

PATENTED MAY 9 1972

INVENTOR
Arthur A. Lemke
BY Dressler, Goldsmith, Clement & Gordon
ATTORNEYS

METHOD AND APPARATUS FOR FLUSHING SEWERS

This invention relates to method and apparatus for periodically creating surges of sewage flow in sewage collection systems. More particularly, it relates to method and apparatus positioned in manholes to accumulate therein volumes of sewage for subsequent rapid release and thereby accomplish a sewer flushing action. Still more particularly, it relates to a sewer system manhole adapted with a sewage accumulation tank and means for drawing a volume of sewage into said accumulation tank which will be sufficient upon rapid release to create a flushing action in the downstream portion of the sewage system connection with said manhole.

In accordance with this invention, raw sewage, which is flowing in a sewage collection system of conduits for liquid interspaced with manholes, is accumulated in volumes sufficient to act as a flushing medium by creating in a manhole an isolated liquid holding zone having a bottom outlet communicating with the manhole at a level below that of the outlet conduit from said manhole, accumulating sewage in the holding zone under conditions to hold the sewage until released under conditions fostering emptying in a volume and at a rate creating a flushing surge in the volume of sewage leaving the manhole.

Studies on sewage collection systems have clearly established that, during normal or low volume flow periods, organic solids as well as other solids may not be maintained in suspension and appreciable quantities thereof accumulate in the conduits as settled solids. When a large volume of water, such as the runoff during and after a rainstorm, passes through the sewage collection system, the solids content studies show a peak for suspended solids content shortly before or at least about the time that liquid flow passes its peak. This suspended solids content has been found to be many times greater than the amount of solids which was estimated for the combined sewer overflow when initiating tests, i.e., the suspended solids collected over a few hour runoff period was equal to the total solids present in the normal flow of sewage over a period of days, the actual amount, of course, showing a variation depending upon the length of time between runoffs.

When this rush of sewage and rain water in a combined sewer reaches a treatment plant, it is often necessary to shorten the treatment time and discharge a large volume overflow or to bypass combined sewage to receiving waters. Under such conditions, in a few hours the pollutants entering the receiving waters in large slugs may result in large pollution loads entering a liquid receiving body via treatment plant effluents.

Based upon the available information indicating that a large portion of the high organic load at the start of a storm is the flushing out of solids which have settled in the sewer, it has been suggested that the sewer system be periodically flushed. One suggested system is the Miller flush tanks which are filled with fresh potable water from which the water is periodically released. Such flush tanks utilize volumes of water which add materially to the expense of operating the sewer system. In addition, there is always the danger of contaminating the potable water system of a municipality through the cross connection between it and the sewer system.

Now it has been discovered that elimination of settled solids from sewers can be accomplished in a manner which is relatively inexpensive compared to the systems heretofore suggested and without bringing in large volumes of water which further dilute the sewage, if a portion of the raw sewage, which is flowing through the manhole is withdrawn to an isolated holding zone for liquid through a liquid passage forming a link between the lower portion of the isolated holding zone and the sewage. The liquid passage should be of a size to pass sewage in volumes and at a rate to act as a flushing liquid under the influence of the hydraulic head of liquid created in the isolated holding zone. The sewage movement through the liquid passage during accumulation of volumes of sewage required for flushing generally is induced by creation of sub-atmospheric pressure within said holding zone, and the accumulated sewage is released to effect flushing by elimination of the sub-atmospheric pressure conditions acting to hold the accumulated sewage within said holding zone.

The method of flushing sewers utilizing an accumulated volume of sewage for periodic addition to the regular volume of sewage flowing in the sewer conduits which are connected by manholes comprises forming within the manhole an isolated holding zone for liquid which communicates through a liquid passage with the normal flow of sewage through the manhole at an elevation below that of the outlet sewer conduit, creating sub-atmospheric pressure within said holding zone, drawing aqueous sewage into said isolated holding zone in response to said sub-atmospheric pressure, and when said holding zone has accumulated a predetermined volume of aqueous sewage admitting air to said holding zone whereby aqueous sewage empties from the holding zone at the capacity rate of said bottom outlet of said holding zone in a flushing surge of normal sewage flow plus the volume of aqueous sewage discharging from the holding zone.

In one embodiment of the invention, the apparatus for inducing periodic surges to effect flushing of sewers utilizing sewage flowing in conduits interconnected by manholes comprises a manhole having a liquid sump below the elevational level of the inlet and outlet sewer conduits, said sump being tapered both from the inlet and outlet sides to a limited area transition zone, a tank positioned with longitudinal axis in a substantially vertical position and having an opening in the bottom portion thereof serving as a common liquid inlet thereto and outlet therefrom positioned at the level of said transition zone, with the opening preferably facing the outlet to direct the flow so as to take advantage of the kinetic energy of the discharge and to minimize the effects of sewage flow past the outlet to the holding zone, piping means communicating with the upper head portion of said tank and connecting said tank to a source of sub-atmospheric pressure or vacuum, means for admitting air to said vacuum tank, valving means associated with said means for admitting air and means for effecting a predetermined period of delay of closing of said valving means after air is admitted to said vacuum tank whereby the entire volume of sewage accumulated in said tank may be discharged.

The volume of sewage required for flushing must be correlated to an average volume of sewage flow and the size of the outlet from the holding tank must be arranged to provide a flow rate through the outlet from the holding tank under atmospheric pressure conditions which, when added to the normal flow will create a significant liquid surge. If one assumes that 266 gallons or 35.6 cubic feet of liquid is required for flushing, and the necessity in order to accomplish a flushing effect, of discharge of the 266 gallons of sewage in 10 seconds, i.e., at an average rate of 3.56 cubic feet of liquid per second, an outlet from the holding zone would be required of approximately 8 inch diameter circular cross-sectional configuration.

A factor requiring consideration in determining the sub-atmospheric pressure to be exerted to draw sewage into the holding tank is the height to which the liquid must be raised, i.e., the liquid head above the surface level maintained by an average sewage flow through the manhole. If the difference in height varies from, for example, 3 feet to 10 feet, the apparatus producing a vacuum must be capable of producing a sub-atmospheric pressure of about 4.5 pounds per square inch gauge in the holding tank.

When the desired volume of flushing liquid is accumulated periodically, it is necessary to have a significant increase in pneumatic pressure so that the accumulated sewage will flow from the tank. The pressure preferably is raised to atmospheric pressure by opening of valving which admits atmospheric air to the holding tank. If desired, superatmospheric pressures may be exerted in order to increase the velocity with which the accumulated sewage discharge from the tank and to shorten the discharge time.

Vacuum release mechanisms may take a variety of forms. A relatively simple form of apparatus to simultaneously activate the vent valve and cut off the vacuum system is a float which upon reaching a fixed position based upon liquid level within the holding tank will open an air valve and cut off, for example, the electrical circuit which energizes a vacuum pump. When such a float drops as the liquid level falls, the air valve closes and the electrical circuit is again closed so that current can flow to the electrical motor of the pump subject to conventional controls which permit energizing the electrical circuit only for predetermined periods.

An essential requirement for satisfactory operation of a vacuum tank as a sewer flushing device is that the sub-atmospheric or vacuum pressure in the head space of the tank, which causes the water level to rise to a predetermined level, must be changed quickly to atmospheric pressure or higher pressure so that the maximum pressure is available to discharge the contents of the tank in the shortest possible time and the positive pressure be maintained for substantially the whole period necessary to empty the vacuum tank.

When the water level in the vacuum tank reaches a predetermined level and the tank is to be emptied, there must be a positive means of opening a vacuum release or air valve and holding it open until the tank contents are discharged. If the valve recloses too soon upon drop in water level, there might exist a condition of reestablishment of partial vacuum so that liquid discharge would be arrested and there would be insufficient liquid released or released at a rate too slow to have a flushing action.

Delay of closure of an air valve may be accomplished by numerous means. One example is a ball valve wherein the ball is lightweight and the inlet passageways for the air are of a size to develop an appreciable air velocity and are directed upwardly against the ball so that while a considerable volume of air is moving the ball will be suspended away from the valve seat.

Another means of delaying air valve closure may be illustrated by a hinged lid for an air valve provided with a high friction bearing which causes the lid to close slowly under its own weight after the thrust of the mechanism required to force the valve open is withdrawn. An alternative to use of a friction bearing is a dash pot operating with a valve closure plate, the actuation coming from the weight of the plate or from a closing spring.

When flushing can be produced at more than one manhole, electrical controls can be integrated so that surges of flow can be made to occur sequentially along various segments of the sewage collection system or simultaneously in so-called laterals so that a rather violent surge occurs in the main channels of the sewage collection system.

The invention will be further understood and be apparent to those skilled in the art by reference to the following description of an embodiment given by way of example wherein.

Figure 1:
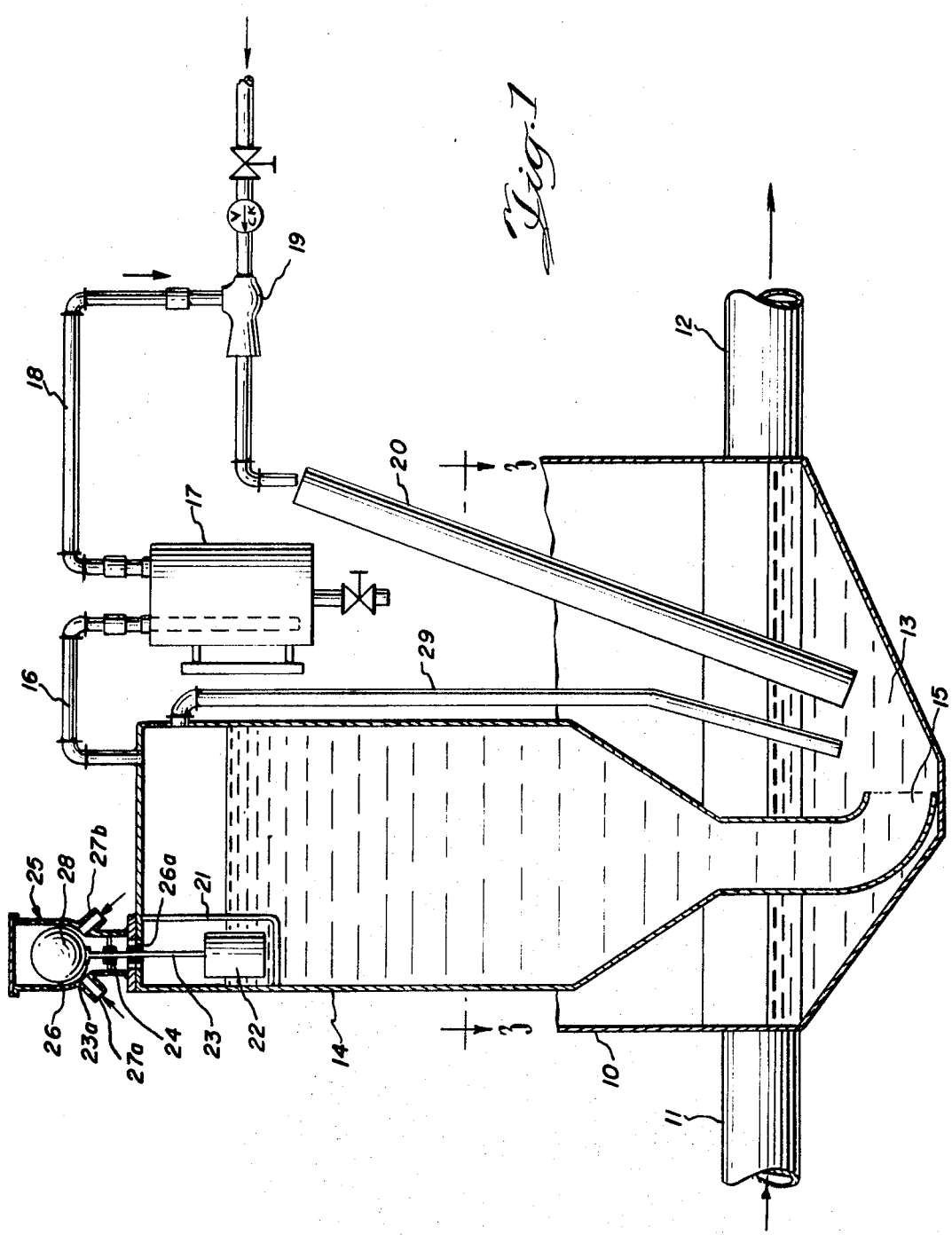
FIG. 1 is a side elevational view of the manhole and the flushing elements shown.
Figure 2:
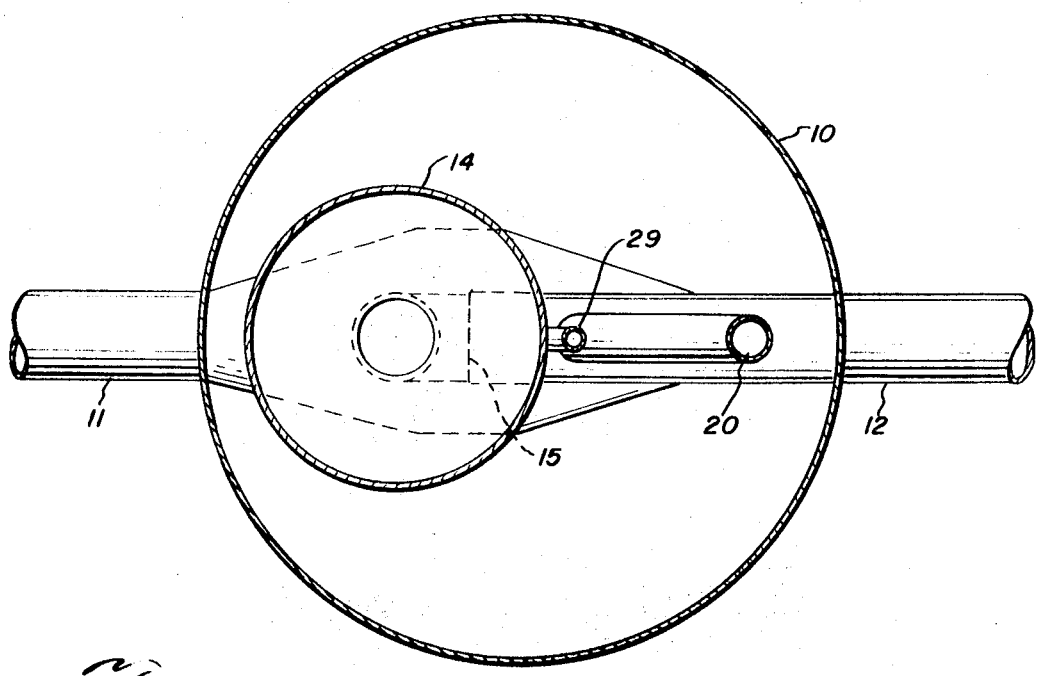
FIG. 2 is a top plan view of a manhole with accumulation tank therein.

Referring to FIGS. 1 and 2, the numeral 10 indicates a manhole of a sewage collection system. Sewage enters the manhole through inlet sewer 11 and leaves through outlet sewer 12. Manhole 10 is provided with a liquid sump 13.

Mounted within manhole 10 is a tank 14 having the common inlet and outlet opening 15 positioned adjacent the bottom of liquid sump 13.

The interior of tank 14 communicates with an intermediate receiver 17 through pipe 16. The intermediate receiver 17 communicates through pipe 18 with an air exhauster 19, illustrated as a venturi type device operating with water from a city supply source. Water discharging from the air exhauster 19 is conveyed by drainpipe 20 to the sump 13 of manhole 10.

Tank 14 is provided in its upper portion with a float cage 21. Within cage 21 is a suitably shaped float 22 which will move vertically upward when moved by a rising level of liquid in tank 14. Float 22 is connected to a suitable stem 23 which extends through a guide 24 in the top of tank 14 into an air valve 25 mounted exteriorly of the tank.

Air valve 25 consists of a casing 26 with air inlet ports 27a and 27b. The interior surfaces of inlet ports 27a and b are formed as valve seats of a configuration to produce closure when contacted by a ball 28. Stem 23 which enters casing 26 from the bottom is provided at the upper end with a plate member 23a which contacts the ball when the float 22 rises to a predetermined water level in the tank, to raise the ball off the valve seat and to admit air which will flow through casing 26 and orifice 26a into the tank 14. Tank 14 also is provided with a pipe 29 which communicates with the headspace of tank 14 and extends downwardly so that its outlet is adjacent the flow path of liquid leaving tank 14 for delivery of liquid in the event of liquid overflow from tank 14 and will normally become uncovered by a drop in liquid level while the vacuum tank is discharging thus admitting air to insure that no vacuum will develop to prevent the tank from emptying completely.

Figure 3:
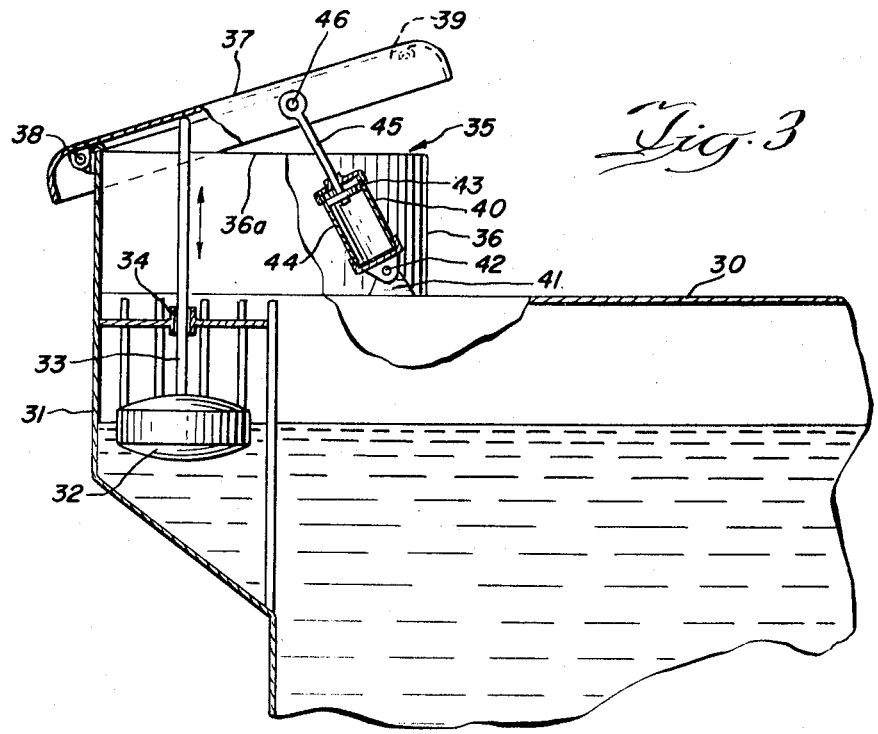
FIG. 3 is a sectional view of a tank with alternative vacuum release apparatus.

Referring to FIG. 3, tank 30 is provided in its upper portion with a float cage 31. Within cage 31 is a suitably shaped float 32 which will move vertically upward when moved by a rising level of liquid in tank 30. Float 32 is connected to a suitable stem 33 which extends through a guide 34 in the float cage 31 into an air valve 35 mounted exteriorly of the tank.

Air valve 35 consists of a walled chamber 36 with a top closure lid 37 movable about a hinge 38. The closure lid 37 having sealing means 39 for rendering the contact with the upper portion 36a of walled chamber 36 airtight. Stem 33 which enters the walled chamber 36 from the bottom directly contacts top closure lid 37 when the float 32 rises to a predetermined water level in the tank to force the lid upward and open the chamber to the atmosphere.

Mounted on top of chamber 30 is a dash pot 40. Dash pot 40 is pivotably attached to a base 41 by pin 42. The interior of dash pot 40 is provided with a plunger 43 inside the tubular section 44 which has secured thereto an arm 45. Arm 45 is pivotally secured to lid 37 by pin 46.

Plunger 43 moving within tubular section 44 effects a delayed closing of lid 37.

If at the predetermined high water level in the tank, the tank holds approximately 36 cubic feet of aqueous sewage, about 210 gallons of the sewage will empty from a tank having a 12-inch diameter outlet in from about 5 to about 15 seconds for hydraulic heads in the range between about 10 and about 5 feet of differential between the liquid level in the tank at the start of discharge therefrom and the downstream water level.

If the vacuum tank holding approximately 36 cubic feet of aqueous sewage has a diameter of 2 feet 6 inches and the head space, when the vacuum tank is filled to the desired capacity, is 1 foot, the average rate at which atmospheric air may enter the valve to induce emptying of the tank in 5 seconds is 9.8 cubic feet per second.

To empty the tank in 5 seconds, if the height of liquid within the tank is 10.5 feet above the liquid level in the manhole, the air valve will require a minimum outlet of 2 inch diameter and for the type of valve shown in FIG. 3, an 8-inch diameter air inlet.

The foregoing detailed description is given for clearness of understanding and no unnecessary limitations should be understood therefrom, for modifications will be obvious to those skilled in the art.

I claim:

1. A method of flushing sewers utilizing the sewage flowing in the conduits connected by manholes which comprises establishing in a manhole an isolated holding zone having a common inlet and outlet at the bottom thereof in submerged communication with sewage flowing through said manhole, creating sub-atmospheric pressure within said holding zone, drawing sewage, in response to said sub-atmospheric pressure into said holding zone, and periodically upon accumulation of a predetermined quantity of sewage, increasing the air pressure at least to atmospheric pressure whereby the accumulated aqueous sewage empties at the capacity rate of said bottom outlet of said holding zone in a flushing surge of holding zone volume of aqueous sewage plus normal sewage flow.

2. A method according to claim 1 wherein the subatmospheric pressure in said holding zone is returned to atmospheric pressure after accumulation of a predetermined quantity of sewage by opening communication between the holding zone and the atmosphere.

3. A method according to claim 1 wherein the subatmospheric pressure in said holding zone is returned to atmospheric pressure after accumulation of a predetermined quantity of sewage by cutting off communication between the source of sub-atmospheric and the holding zone and introducing air under pressure to the head portion of the holding zone.

4. A method according to claim 1 wherein sewage is drawn into said holding zone and discharged from said holding zone through a common communication link.

5. An apparatus for flushing sewers utilizing the sewage flowing in the conduits connected by manholes which comprises a manhole, inlet means for sewage, outlet means for sewage, a tank positioned in said manhole with an opening in the bottom portion thereof serving as a common liquid inlet thereto and liquid outlet therefrom, a source of sub-atmospheric pressure, piping means communicating with the upper portion of said tank and with said source of sub-atmospheric pressure, and means for admitting air to the upper portion of said tank.

6. Apparatus according to claim 5 wherein said means for admitting air to said tank is provided with valving means and means for effecting a predetermined period of delay in shutting off the supply of air to said tank.

7. Apparatus according to claim 5 wherein said manhole has a liquid sump below the elevational level of the outlet from said manhole with tapered sides and said tank has the bottom outlet therefrom positioned in said sump and faced toward said manhole outlet.

8. Apparatus according to claim 6 wherein auxiliary means for effecting a predetermined period of delay in shutting off the supply of air to said tank consists of piping extending from the top of said tank to a level in said sump where the velocity of sewage flow from said tank outlet creates a drop in liquid level which will uncover the piping outlet for admission of air.

* * * * *